US009813753B2

(12) United States Patent
Mushikabe

(10) Patent No.: US 9,813,753 B2
(45) Date of Patent: Nov. 7, 2017

(54) CORE DEVICE, AUDIO/VIDEO CONTROL SYSTEM, PORTABLE TERMINAL DEVICE, AUDIO/VIDEO CONTROL PROGRAM, AND AUDIO/VIDEO CONTROL METHOD

(71) Applicant: Yamaha Corporation, Hamamatsu-shi, Shizuoka (JP)

(72) Inventor: Kazuya Mushikabe, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 14/403,628

(22) PCT Filed: May 8, 2013

(86) PCT No.: PCT/JP2013/062908
§ 371 (c)(1),
(2) Date: Nov. 25, 2014

(87) PCT Pub. No.: WO2013/179861
PCT Pub. Date: Dec. 5, 2013

(65) Prior Publication Data
US 2015/0113564 A1    Apr. 23, 2015

(30) Foreign Application Priority Data

May 30, 2012  (JP) ................................ 2012-122814

(51) Int. Cl.
*H04N 5/445* (2011.01)
*H04N 21/422* (2011.01)
(Continued)

(52) U.S. Cl.
CPC ....... *H04N 21/4222* (2013.01); *H04L 12/282* (2013.01); *H04L 12/2814* (2013.01);
(Continued)

(58) Field of Classification Search
CPC ............. H04N 21/4622; H04N 21/482; H04N 21/4222; H04N 21/485; H04N 21/6371
(Continued)

(56) References Cited

U.S. PATENT DOCUMENTS

| 2003/0095211 A1* | 5/2003 | Nakajima | G08C 19/28 348/734 |
| 2006/0209892 A1* | 9/2006 | MacMullan | H04N 5/775 370/468 |

(Continued)

FOREIGN PATENT DOCUMENTS

| JP | 7-298368 A | 11/1995 |
| JP | 7-336778 A | 12/1995 |

(Continued)

OTHER PUBLICATIONS

International Search Report (PCT/ISA/210) dated Jul. 30, 2013 with English-language translation (Four (4) pages).
Japanese Office Action issued in counterpart Japanese Application No. 2015-044073 dated Jan. 27, 2016, with English translation (four (4) pages).

*Primary Examiner* — Jivka Raboviansk
(74) *Attorney, Agent, or Firm* — Crowell & Moring LLP

(57) ABSTRACT

A core device that is connected to a network, and that is interconnected via a digital audio/video interface with audio/video devices that are connected to the network, provided with a collecting unit that collects interface-connected device information, including at least unique identification information, from the audio/video devices via the digital audio/video interface, and a transferring unit that transfers the interface-connected device information to a portable terminal device that is connected to the network.

15 Claims, 11 Drawing Sheets

(51) Int. Cl.
  *H04N 21/41* (2011.01)
  *H04N 21/426* (2011.01)
  *H04N 21/436* (2011.01)
  *H04N 21/4363* (2011.01)
  *H04L 12/28* (2006.01)
  *H04N 21/472* (2011.01)
  *H04N 21/485* (2011.01)
  *H04N 21/6371* (2011.01)
  *H04L 29/12* (2006.01)

(52) U.S. Cl.
  CPC ... *H04N 21/4126* (2013.01); *H04N 21/42208* (2013.01); *H04N 21/42684* (2013.01); *H04N 21/43615* (2013.01); *H04N 21/43635* (2013.01); *H04N 21/47217* (2013.01); *H04N 21/485* (2013.01); *H04N 21/6371* (2013.01); *H04L 61/103* (2013.01)

(58) Field of Classification Search
  USPC .............................. 725/35, 37, 93, 110, 133
  See application file for complete search history.

(56) References Cited

U.S. PATENT DOCUMENTS

| | | |
|---|---|---|
| 2010/0223370 A1 | 9/2010 | Kase et al. |
| 2011/0032425 A1 | 2/2011 | Kamohara |
| 2013/0016858 A1 | 1/2013 | Masaki et al. |
| 2013/0094423 A1* | 4/2013 | Wengrovitz et al. ......... 370/312 |

FOREIGN PATENT DOCUMENTS

| | | |
|---|---|---|
| JP | 11-3314 A | 1/1999 |
| JP | 2005-510971 A | 4/2005 |
| JP | 2008-15616 A | 1/2008 |
| JP | 2010-87894 A | 4/2010 |
| JP | 2011-35797 A | 2/2011 |
| JP | 2011-199568 A | 10/2011 |
| JP | 2011-217316 A | 10/2011 |
| WO | WO 03/047243 A1 | 6/2003 |
| WO | WO 2009/044500 A1 | 4/2009 |

* cited by examiner

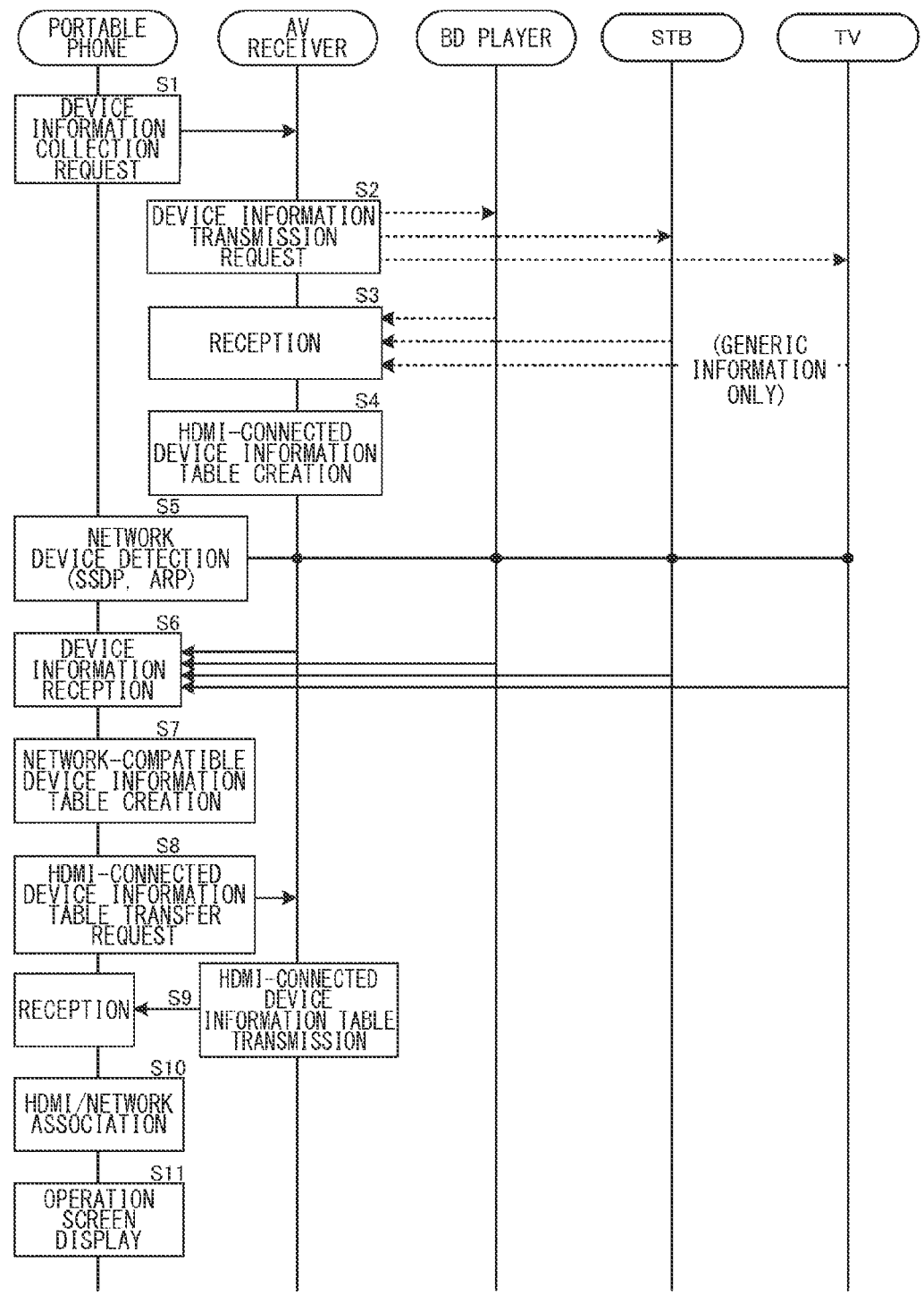

FIG. 5

| DEVICE TYPE | CONNECTION | CEC | EDID | OSD Name | VENDER ID | Mac Address | uuid | SERVICE |
|---|---|---|---|---|---|---|---|---|
| SELF | HDMI | yes | 1000 | AV Receiver | 0x000000 | xx-xx-xx-xx-xx-xx | xxxxxxxx-xxxx-xxxx-xxxx | Tuner<br>Net Radio<br>USB |
| INPUT | HDMI | yes | 1100 | BD Player | 0x000000 | xx-xx-xx-xx-xx-xx | xxxxxxxx-xxxx-xxxx-xxxx | Blu-Ray<br>CD<br>USB |
| INPUT | HDMI | yes | 1200 | Set Top Box | 0x000000 | xx-xx-xx-xx-xx-xx | xxxxxxxx-xxxx-xxxx-xxxx | CATV |
| OUTPUT | HDMI | yes | 0000 | TV | 0x000001 | — | — | (TERRESTRIAL TV BROADCAST) |

231

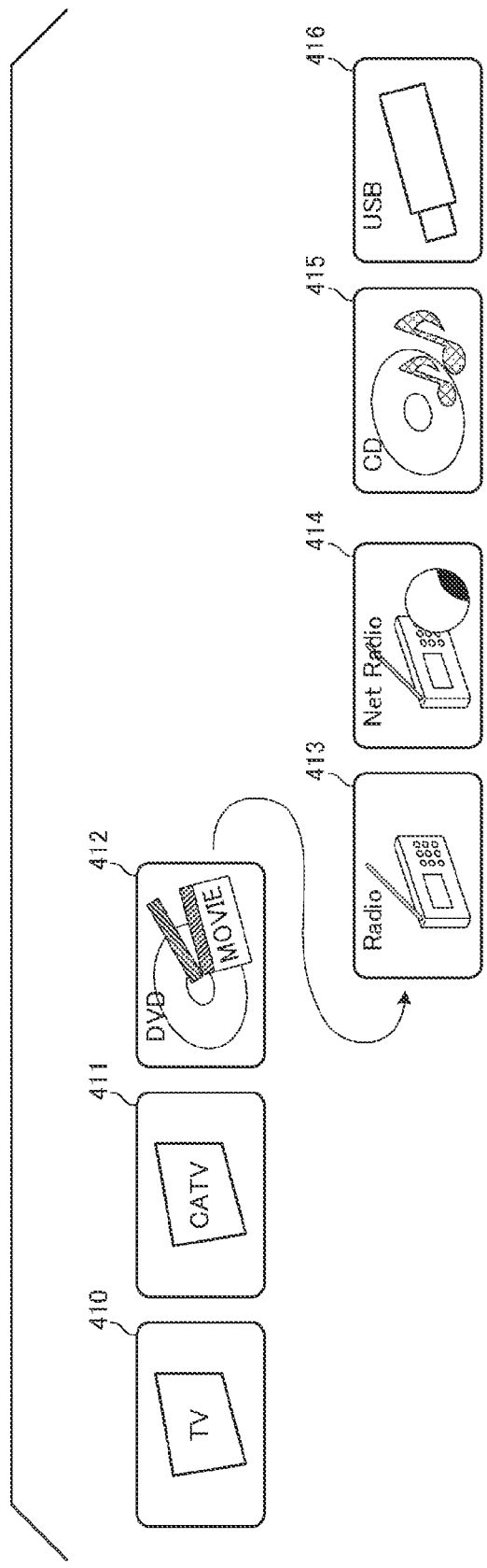

CORE DEVICE, AUDIO/VIDEO CONTROL SYSTEM, PORTABLE TERMINAL DEVICE, AUDIO/VIDEO CONTROL PROGRAM, AND AUDIO/VIDEO CONTROL METHOD

TECHNICAL FIELD

The present invention relates to an audio/video control system that controls an audio/video system from a portable terminal device such as a smartphone.

Priority is claimed on Japanese Patent Application No. 2012-122814, filed May 30, 2012, the content of which is incorporated herein by reference.

BACKGROUND ART

In an audio/video system (AV system) including a plurality of devices, it has conventionally been necessary to individually control each one using the remote control belonging to each device. However, in recent years, technology has been proposed for controlling this kind of AV system with one remote control unit (refer to Patent Document 1). This AV system has the following characteristics. A television having a control system acquires a task-based control feature from an audio/video (AV) device that is connected to the television by HDMI-CEC or IEEE 1394, and transmits that control feature to the remote control unit. The remote control unit displays the received task-based control feature to receive an operation by the user, and transmits that operation content to the television. The television, having received the operation content, controls the AV device that is the control target via HDMI-CEC or IEEE 1394.

PRIOR ART DOCUMENTS

Patent Document

[Patent Document 1] Japanese Unexamined Patent Application, First Publication No. 2010-028802

SUMMARY OF THE INVENTION

Problem to be Solved by the Invention

In the aforementioned AV system, the only partner that the remote control unit directly communicates with is the television. Therefore, other devices need to transmit control features via HDMI-CEC, and receive the operation content of the user via HDMI-CEC. However, information that can be transmitted and received by HDMI-CEC is limited to 14 bytes or less per data, so transmitting and receiving a large amount of information is difficult. For this reason, extending the interface by for example providing an abundant amount of information to a user or acquiring a large amount of information from the remote control unit has been difficult.

An exemplary object of the present invention is to provide an audio/video control system that is capable of transmitting and receiving a large amount of information between an AV system and a portable terminal device (controller).

Means for Solving the Problem

A core device according to an aspect of the present invention is connected to a network, is interconnected via a digital audio/video interface with an audio/video device connected to the network, and includes: a collecting unit that collects interface-connected device information including at least unique identification information, from the audio/video device via the digital audio/video interface; and a transferring unit that transfers the interface-connected device information to a portable terminal device connected to the network.

An audio/video control system according to an aspect of the present invention includes: a plurality of audio/video devices that are interconnected by a digital audio/video interface and are each connected to a network; and a portable terminal device that is connected to the network.

The core device includes a collecting and transferring unit that collects interface-connected device information including at least unique identification information from the plurality of audio/video devices via the digital audio/video interface, the collecting and transpiring unit transferring the interface-connected device information to the portable terminal device.

The portable terminal device includes: a first acquisition unit that searches the network and acquires network-compatible device information including network addresses and unique identification information of devices on the network; a second acquisition unit that acquires the interface-connected device information from the core device; a resolving unit that associates the network-compatible device information and the interface-connected device information to resolve network addresses of the plurality of audio/video devices; and a device control unit that directly controls each of the plurality of audio/video devices via the network using the resolved network addresses.

In the aforementioned audio/video control system, the collecting and transferring unit of the core device may further collect, as the interface-connected device information, information of an audio source or a video source that is playable by each audio/video device, the portable terminal device may include an operation screen display unit that displays as a list in a selectable manner symbolic images showing the audio sources and video sources that are playable by the plurality of audio devices, and the device control unit, in accordance with a selection of a symbolic image by the user, may directly transmit to a corresponding audio/video device one or a plurality of commands instructing processing for playing an audio source or a video source that is shown by the selected symbolic image.

In the aforementioned audio/video control system, the resolving unit may determine that, among devices on the network, devices having the same unique identification information as the unique identification information included in the interface-connected device information are the plurality of audio/video devices, and resolve network addresses of the devices determined to be the plurality of audio/video devices from the network-compatible device information.

A portable terminal device according to an aspect of the present invention is connected to a network, and includes: a first acquisition unit that searches the network and acquires network-compatible device information including network addresses and unique identification information of devices on the network; a second acquisition unit that acquires interface-connected device information including at least unique identification information of a plurality of audio/video devices, the plurality of audio/video devices being connected to the network and being interconnected by a digital audio/video interface; a resolving unit that associates the network-compatible device information and the interface-connected device information to resolve network addresses of the plurality of audio/video devices; and a device control unit that directly controls each of the plurality of audio/video devices via the network using the resolved network addresses.

In the aforementioned mobile terminal device, the interface-connected device information acquisition unit may further acquire, as the interface-connected device information, information of an audio source or a video source that is playable by each audio/video device, the portable terminal device may further include an operation screen display unit that displays as a list in a selectable manner symbolic images showing the audio sources and video sources that are playable by the plurality of audio devices, and the audio device control unit, in accordance with a selection of a symbolic image by the user, may directly transmit to a corresponding audio/video device one or a plurality of commands instructing processing for playing an audio source or a video source that is shown by the selected symbolic image.

In the aforementioned portable terminal device, the resolving unit may determine that, among devices on the network, devices having the same unique identification information as the unique identification information included in the interface-connected device information are the plurality of audio/video devices, and resolve network addresses of the devices determined to be the plurality of audio/video devices from the network-compatible device information.

An audio/video control program according to an aspect of the present invention causes a control unit of a portable terminal device connected to a network to function as: a first acquisition unit that searches the network and acquires network-compatible device information including network addresses and unique identification information of devices on the network; a second acquisition unit that acquires interface-connected device information including at least unique identification information of a plurality of audio/video devices, the plurality of audio/video devices being connected to the network and being interconnected by a digital audio/video interface; a resolving unit that associates the network-compatible device information and the interface-connected device information to resolve network addresses of the plurality of audio/video devices; and a device control unit that directly controls each of the plurality of audio/video devices via the network using the resolved network addresses.

The aforementioned audio/video control program may further cause the control unit of the portable terminal device to function as an operation screen display unit that displays as a list in a selectable manner symbolic images showing the audio sources and video sources that are playable by the plurality of audio devices, the second acquisition unit may further acquire, as the interface-connected device information, information of an audio source or a video source that is playable by each audio/video device, and the device control unit, in accordance with a selection of a symbolic image by the user, may directly transmit to a corresponding audio/video device one or a plurality of commands instructing processing for playing an audio source or a video source that is shown by the selected symbolic image.

An audio/video control method according to an aspect of the present invention includes: collecting interface-connected device information including at least unique identification information, via a digital audio/video interface, from an audio/video device connected to a network; and transferring the interface-connected device information to a portable terminal device connected to the network.

Effect of the Invention

According to an embodiment of the invention, it is possible to send and receive a large amount of information between an AV system and a portable terminal device (controller).

BRIEF DESCRIPTION OF THE DRAWINGS

FIG. 4 is a flowchart that shows a communication procedure between the portable phone and each device of the AV system shown in FIG. 1.

FIG. 5 is a diagram that shows an example of an HDMI-connected device information table provided in the portable phone shown in FIG. 2.

FIG. 8 is a diagram that shows the row of service icons displayed in the operation screen that is displayed in the AV controller shown in FIG. 3.

EMBODIMENTS FOR CARRYING OUT THE INVENTION

Figure 1:
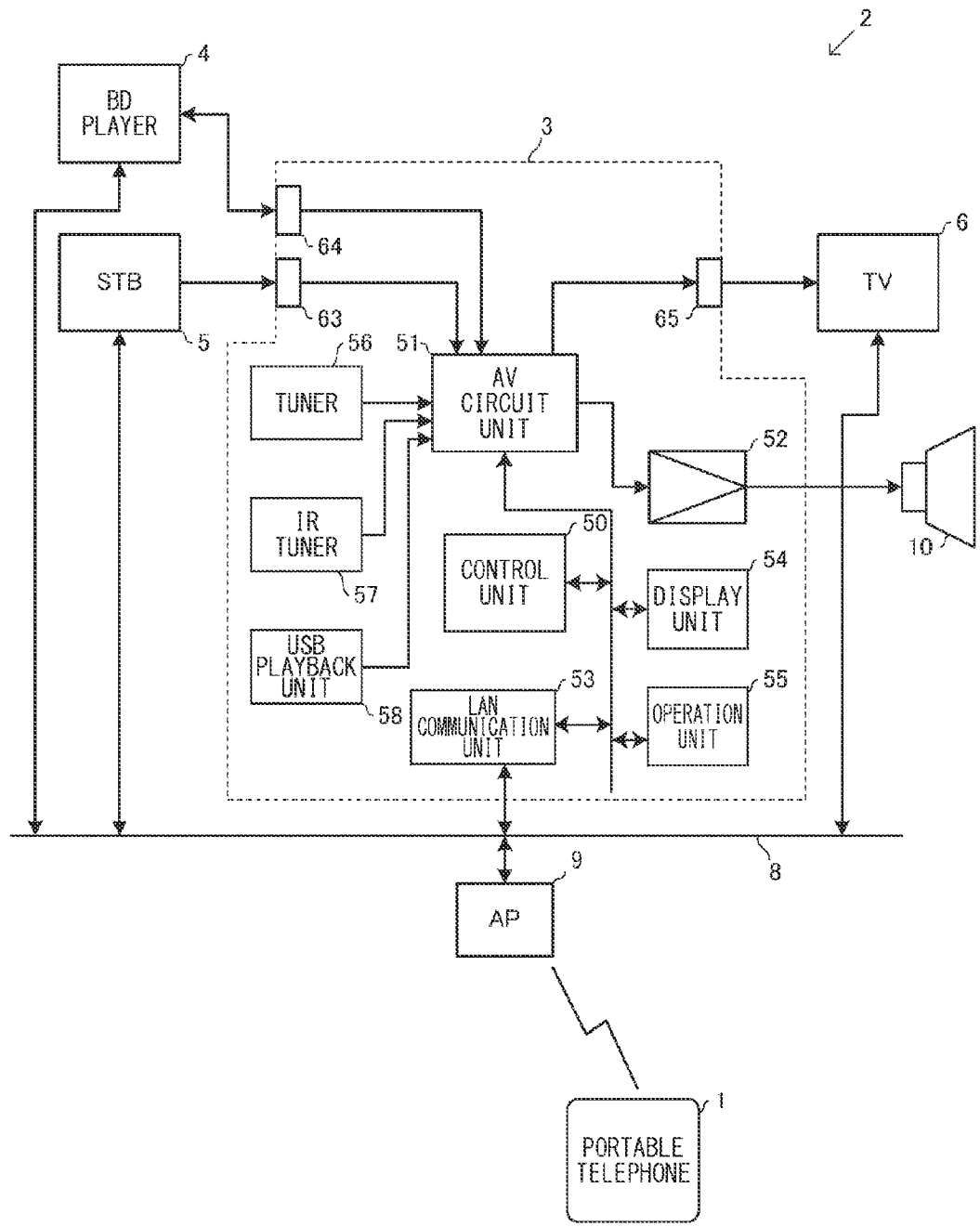
FIG. 1 is a configuration diagram of the AV system according to an embodiment of this invention.

FIG. 1 is a diagram that shows the constitution of an AV (audio/video) system 2 according to an embodiment of the present invention. The AV system 2 has a constitution in which a Blu-ray Disc (trademark) (BD) player 4 that is a playback device, a set-top box (STB) 5, and a television receiver (TV) 6 that is a video display device are connected to an AV receiver 3 that is a core device of the embodiment of the present invention. The Blu-ray Disc player 4 and the set-top box 5 are connected with the AV receiver 3 by HDMI (trademark). The AV receiver 3 and the television receiver 6 are connected by HDMI (trademark). The AV system 2 according to the embodiment of the present invention is not limited to the illustrated constitution.

The AV receiver 3 is a device that serves as the core of the AV system 2, and performs processing and switching of AV (audio/video) signals. The AV receiver 3 receives the input of AV signals that the Blu-ray Disc player 4 and the set-top box 5 have played. The AV receiver 3 performs signal processing and amplification of the audio signal in the AV signal and then outputs it to a speaker 10. Also, the AV receiver 3 performs signal processing of the video signal and then outputs it to the television receiver 6. The input and output as well as the transmittance of these AV signals are performed by HDMI (trademark) (High-Definition Multimedia Interface).

The AV receiver 3, the Blu-ray Disc player 4, the set-top box 5, and the television receiver 6 are connected to a network 8. Also, a portable phone 1, which is the portable terminal device of the embodiment of the present invention, is also connected to the network 8. The network 8 is constituted by a LAN (local area network) that is constituted for example by Ethernet (trademark) (IEEE 802.3) or Wi-Fi (IEEE 802.11g). The network 8 has an access point (AP) 9 that is a relay for a wireless LAN (Wi-Fi). The portable phone 1 is connected to the network 8 via the access point 9. In FIG. 1, each device of the AV system 2 (the AV receiver 3, the Blu-ray Disc player 4, the set-top box 5, and the television receiver 6) is shown to be connected to the network 8 by wired LAN (Ethernet (trademark)), but this embodiment is not limited to such a constitution. All or some of the devices of the AV system 2 may be connected to the network 8 by wireless LAN (Wi-Fi).

In the AV system 2, the devices are mutually connected by HDMI (trademark). Transmission and reception of command messages and information messages by HDMI-CEC (Consumer Electronics Control) between devices is possible. Also, in this embodiment, each device of the AV system 2 and the portable phone 1 are connected to the network 8. Communication between the devices by the DLNA (Digital Living Network Alliance) standard or a specific standard is possible.

Using this communication function, in the present embodiment, the AV system 2 is controlled in the following manner. The AV receiver 3, which is the core device, collects the connection modes and functions of each device of the AV system 2 via HDMI-CEC, and transmits the collected information to the portable phone 1. The portable phone 1 functions as a controller of the AV system 2, and controls each device of the AV system 2 via the network 8. By using the network 8, the portable phone 1, which is a controller, is able to directly communicate with each device of the AV system 2, and so faster and larger-capacity communication than HDMI-CEC becomes possible. In order to have the portable phone 1 function as an AV controller, an AV controller program 70 (refer to FIG. 2 and FIG. 3) that is an application program is launched on the portable phone 1.

Referring to FIG. 1, the detailed constitution of the AV receiver 3 shall be described. The AV receiver 3 has a control unit 50, an AV circuit unit 51, a power amplifier 52, a LAN communication unit 53, a display unit 54, an operation unit 55, a tuner 56, an Internet radio (IR) tuner 5757, HDMI input units 63, 64, and an HDMI output unit 65. The control unit 50 may function as a portion or all of a collecting unit, a transferring unit, and a collecting-transferring unit. The control unit 50 includes a computer and controls the operation of the AV receiver 3 and the AV system 2. The AV circuit unit 51, the power amplifier 52, the LAN communication unit 53, the display unit 54, the operation unit 55, the tuner 56, the Internet radio tuner 57, a USB playback unit 58, the HDMI input units 63, 64, and the HDMI output unit 65 are connected to the control unit 50.

The HDMI input unit 63 is connected to the Blu-ray Disc player 4. The HDMI input unit 64 is connected to the set-top box 5. The HDMI input units 63 and 64 each have an HDMI connector and an HDMI input circuit. The HDMI input units 63, 64 input to the AV circuit unit 51 the digital AV signals that have been input from the Blu-ray Disc player 4 and the set-top box 5, and control the communication between the Blu-ray Disc player 4 and set-top box 5 with the control unit 50.

The television receiver 6 is connected to the HDMI output unit 65. The HDMI output unit 65 has an HDMI connector and an HDMI output circuit. The HDMI output unit 65 outputs to the television receiver 6 the digital AV signal that has been processed by the AV circuit unit 51, and controls the communication between the television receiver 6 and the control unit 50.

The control unit 50 performs communication by HDMI-CEC via the HDMI input units 63, 64 and the HDMI output unit 65 between the Blu-ray Disc player 4, the set-top box 5 and the television receiver 6. In the case of this embodiment, the control unit 50 collects the information of each device. For this reason, the control unit 50 transmits a device information enquiry message to the Blu-ray Disc player 4, the set-top box 5 and the television receiver 6. Also, in response to this enquiry, the Blu-ray Disc player 4, the set-top box 5 and the television receiver 6 send back a device information message to the control unit 50. The device information message includes the entry contents of the HDMI-connected devices table of FIG. 5.

The LAN communication unit 53 controls communication via the network 8. As described above, the portable phone 1 is connected via the access point 9 to the network 8, and the control unit 50 communicates with the portable phone 1 via the LAN communication unit 53 and the network 8.

The AV circuit unit 51 outputs to the HDMI output unit 65 the digital AV signals input from the HDMI input units 63, 64. Further, after performing processing such as equalizing, volume adjustment and delay on the digital audio signal of the digital AV signal that has been input, the AV circuit unit 51 outputs this processed audio signal to the power amplifier 52. Also, in the case of the built-in tuner 56, the Internet radio tuner 57 or the USB playback unit 58 being selected as the input source, the AV circuit unit 51, after performing processing such as equalizing and volume adjustment on the audio signal that has been input from them, outputs this processed audio signal to the power amplifier 52. The tuner 56 is a receiving circuit that receives FM broadcasts. The Internet radio tuner 57 is a network circuit unit that receives Internet radio broadcasts from the Internet that is connected via the network 8. The USB playback unit 58 is a circuit unit that has a USB connector and replays audio files that are stored in a USB storage that is connected to this USB connector. The power amplifier 52 amplifies the audio signal that has been input, and outputs it to a speaker 10 that is externally connected. The speaker 10 emits the audio signal that has been input as sound.

The display unit 54 is a liquid crystal display with a backlight that is provided on the operation panel, and displays the operation state of the AV receiver 3 and the AV system 2, and the like. The display unit 54 for example displays the currently selected source, volume value, and song title currently being played.

The operation unit 55 includes various button switches and dials that are provided on the front panel of the AV receiver 3, and detects an operation such as selection of an input source or adjustment of the volume by the user. The operation unit 55 generates an operation signal in accordance with the detected operation, and inputs this operation signal to the control unit 50.

Figure 2:
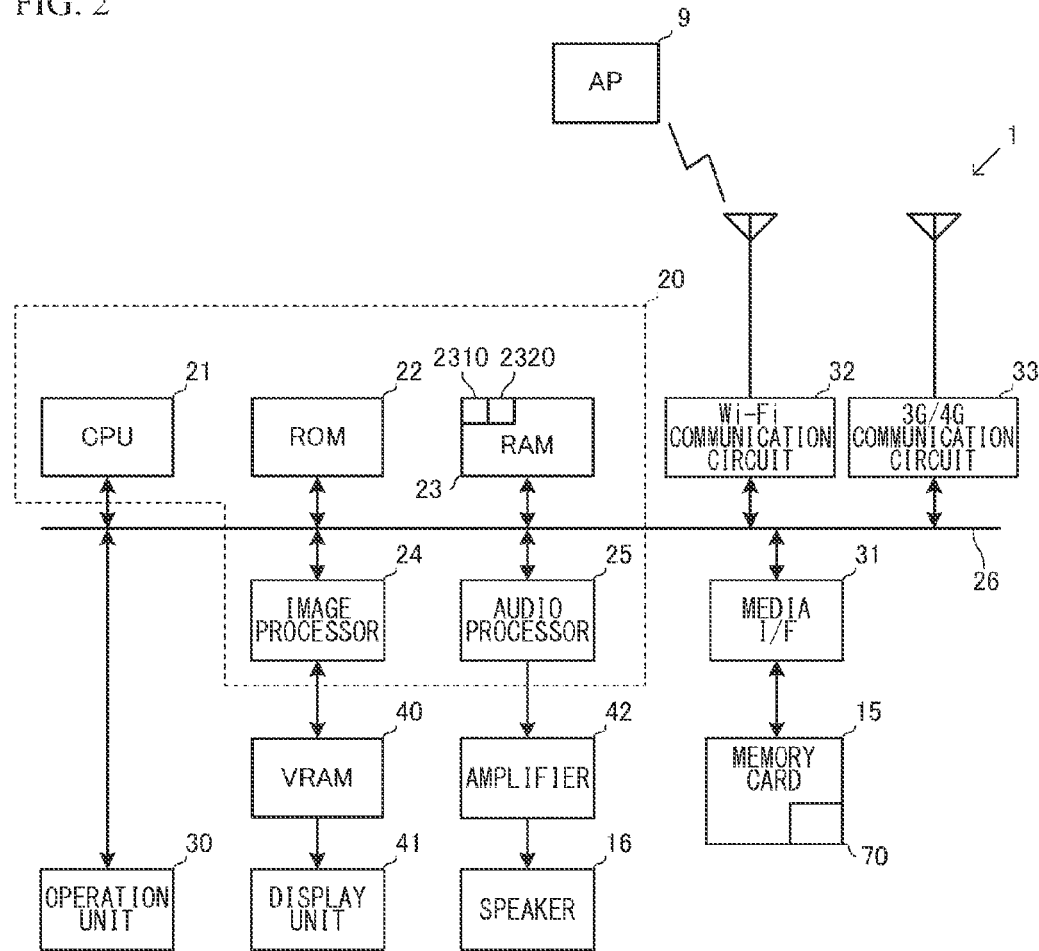
FIG. 2 is a block diagram of a portable phone shown in FIG. 1.

Next, referring to the block diagram of FIG. 2, the constitution of the portable phone 1 shall be described. The portable phone 1 is a multifunction telephone that is a so-called smartphone. The portable phone 1 has a 3G/4G communication function that is a portable communication network, and the aforementioned wireless LAN (Wi-Fi) communication function. By launching the AV controller program 70, which is an application program, the portable phone 1 functions as an AV controller 100 (refer to FIG. 3), communicates with each device of the AV system 2 via the network 8, and controls the AV system 2 in accordance with the operations of the user.

The portable phone 1 has a control unit 20, an operation unit 30, a media interface 31, a Wi-Fi communication circuit 32 and 3G/4G communication circuit 33 on a bus 26. The control unit 20 may function as a portion or all of a first acquisition unit, a second acquisition unit, a resolving unit and a device control unit. The control unit 20 includes a CPU 21, a ROM (flash memory) 22, a RAM 23, an image processor 24, and an audio processor 25. The image processor 24 is connected to a video RAM (VRAM) 40. The VRAM 40 is connected to the display unit 41. The display unit 41 may function as a portion or all of an operation screen display unit. The display unit 41 includes a liquid crystal display, and displays a standby screen, a phone number and the like. Also, the display unit 41 also displays the screen of the AV controller 100 described below. An amplifier 42 that includes a D/A converter is connected to the audio processor 25. A speaker 16 is connected to the amplifier 42.

The image processor 24 includes a GPU (graphics processing unit) that generates various visuals such as a standby screen, a phone number, and the like. In the case of the AV controller program 70 having been launched, the image processor 24 generates an image of the AV controller in accordance with the instruction of the CPU 21, and deploys this image on the VRAM 40. The image that has been deployed on the VRAM 40 is displayed on the display unit 41.

The audio processor 25 has a DSP (Digital Signal Processor) that encodes/decodes the calling voice. The audio processor 25 outputs the decoded/generated voice to the amplifier 42. The amplifier 42 amplifies this voice signal and outputs it to the speaker 16.

The Wi-Fi communication circuit 32 performs wireless communication by the IEEE802.11g standard with the wireless access point 9, and performs transmission and reception of data and messages with devices on the network 8 such as the AV receiver 3. Messages are exchanged between the Wi-Fi communication circuit 32 and the AV receiver 3 in a format stipulated by the DLNA standard or a specific standard. The 3G/4G communication circuit 33 performs voice communication and data communication via the portable phone communication network.

Figure 3:
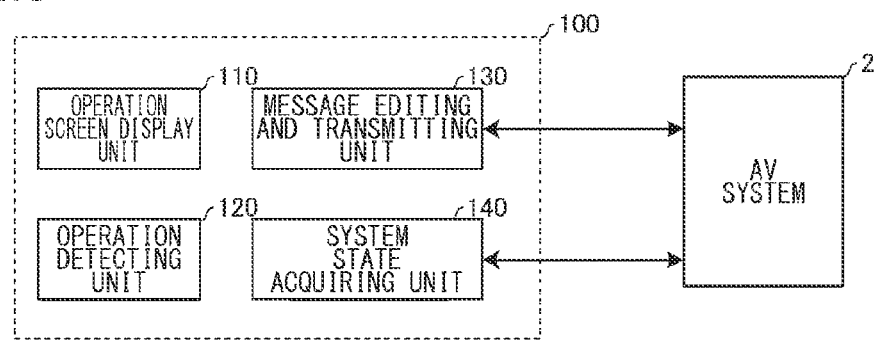
FIG. 3 is a functional block diagram of an AV controller that is constituted by cooperation of the portable phone and an AV controller program according to the embodiment of this invention.

The operation unit 30 includes a touch panel that is formed on the display unit 41, and detects touch operations and flick operations on the touch panel. A memory card 15 is connected to the media interface 31. The memory card 15 is for example a microSD card. The AV controller program 70 is stored in the memory card 15 or the ROM 22. In this embodiment, as shown in FIG. 3, the AV controller program 70 is stored in the memory card 15. The AV controller program 70 may be downloaded by 3G/4G or Wi-Fi data transmission, or may be stored in advance in the ROM 22 or memory card 15.

The ROM 22 stores a basic program for executing calls and application programs of the portable phone 1. The ROM 22 is a flash memory, and besides the basic program, is also capable of storing application programs that have been downloaded.

Work areas that are used when the CPU 20 executes the AV control program are set in the RAM 23. As such work areas, a storage area 2310 that stores an HDMI-connected device information table 231, or a storage area 2320 that stores a network-compatible device information table 232 are set.

Figure 6:
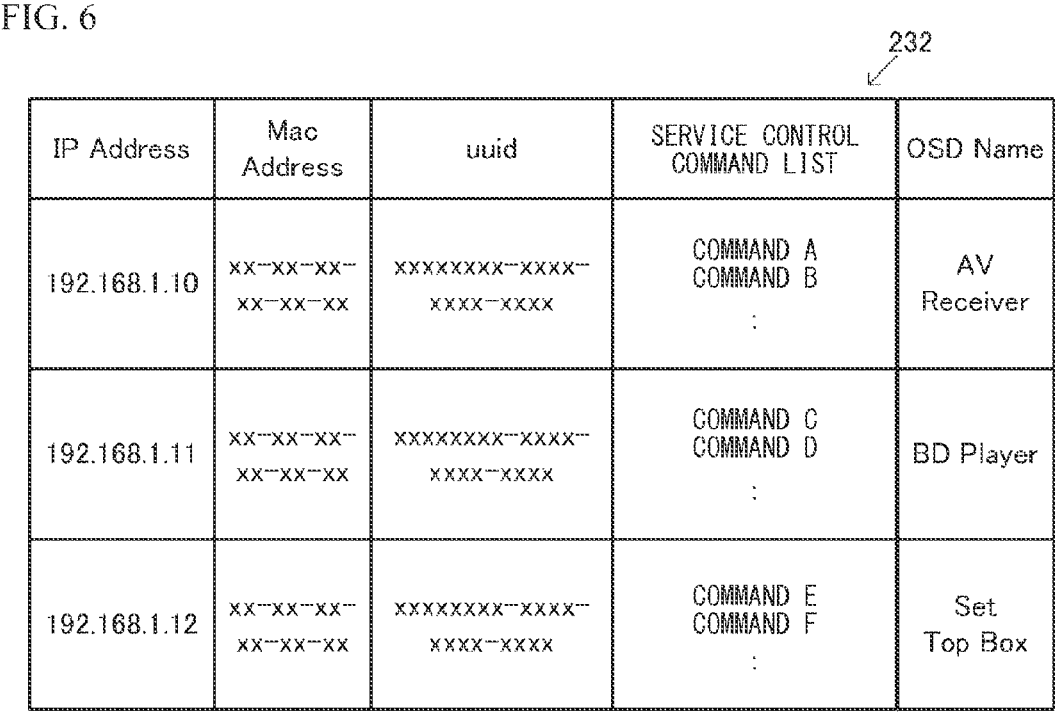
FIG. 6 is a diagram that shows an example of a network-compatible device information table provided in the portable phone shown in FIG. 2.

The HDMI-connected device information table 231 is a table that is illustrated in FIG. 5, and is acquired from the AV receiver 3. Some or all of the information that is included in the HDMI-connected device information table 231 may be interface-connected device information. The HDMI-connected device information table 231 is a table in which the identification information, connection form, function and the like of each device that is connected by HDMI (trademark) centered on the AV receiver 3 is filled in. The network-compatible device information table 232 is a table that is illustrated in FIG. 6. Some or all of the information that is included in the network-compatible device information table 232 may be network-compatible device information. The network-compatible device information table 232 is created by the control unit 20 collecting information of the devices that exist on the network 8 by a protocol such as SSDP (Simple Server Discover Protocol), ARP (Address Resolution Protocol) or the like. Details of these tables shall be described below.

Referring to the function block diagram of FIG. 3, the AV controller 100 that is realized by the AV controller program 70 being read into the portable phone 1 (hardware) shall be described. The portable phone 1 of the constitution shown in FIG. 2 constitutes the AV controller 100 as shown in FIG. 3 by collaboration with the AV controller program 70 that is stored in the memory card 15. The AV controller 100 has an operation screen display unit 110, an operation detecting unit 120, a message editing and transmitting unit 130 and a system state acquiring unit 140.

Figure 7A:
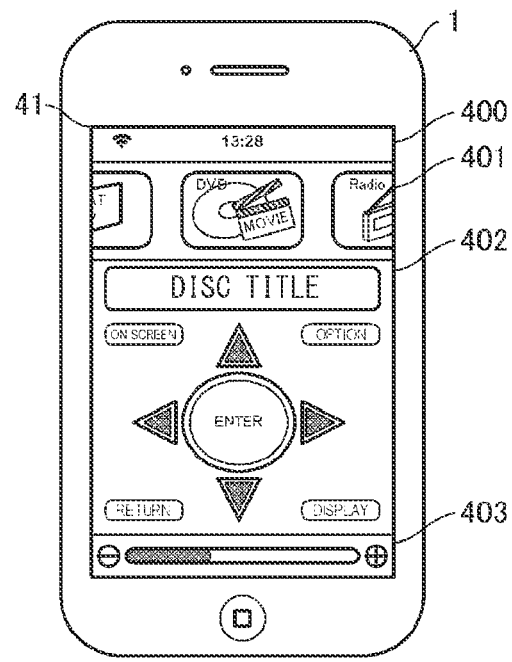
FIG. 7A is a diagram that shows an example of an operation screen displayed in the AV controller shown in FIG. 3.
Figure 7B:
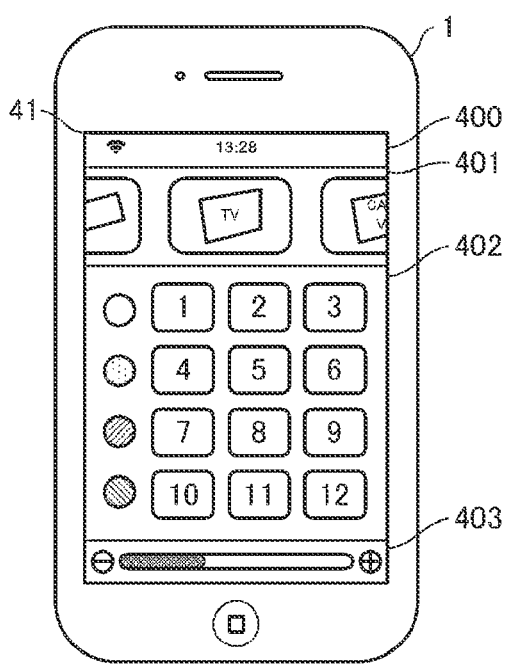
FIG. 7B is a diagram that shows an example of the operation screen displayed in the AV controller shown in FIG. 3.

The operation screen display unit 110 is realized by collaboration of the control unit 20, the VRAM 40, the display unit 41 and the AV controller program 70. The operation screen display unit 110 displays the various operation screens on the display unit 41 of the portable phone 1 as shown in FIG. 7A and FIG. 7B. The operation detecting unit 120 is realized by the collaboration of the control unit 20, the operation unit 30, and the AV controller program 70. The operation detecting unit 120 detects operations on the operation screen shown on the display unit 41 (for example, click operations and drag operations).

The message editing and transmitting unit 130 is realized by the collaboration of the control unit 20, the Wi-Fi communication circuit 32, and the AV controller program 70. The message editing and transmitting unit 130, based on operation information that has been input from the operation detecting unit 120, edits a command message corresponding to the operation information. Then, the message editing and transmitting unit 130 transmits that command message to the corresponding device of the AV system 2. For example, the case of an operation to the effect of playing a Blu-ray Disc being performed by the user shall be described. In this case, the message editing and transmitting unit 130 transmits a command message instructing the input to the AV receiver 3 to be changed to the Blu-ray Disc player 4. Along with this, the message editing and transmitting unit 130 transmits to the Blu-ray Disc player 4 a command message instructing the power to be turned ON and a command message instructing transmission of the title and the like of the disc that has been set.

The system state acquiring unit 140 is realized by the collaboration of the control unit 20, the Wi-Fi communication circuit 32, and the AV controller program 70. The system state acquiring unit 140, at startup of the AV controller 100 or at startup of the AV receiver 3, transmits to the AV receiver 3 a command message that instructs the acquisition of device information from each device of the AV system 2, creation of the HDMI-connected device information table, and transmission of the HDMI-connected device information table. The HDMI-connected device information table 231 that has been thusly acquired is stored in the storage area 2310. The system state acquiring unit 140 periodically (for example, every 5 seconds) acquires the current operating state from each device of the AV system 2.

Next, a description shall be given for the process of associating the devices recognized on the network 8 (network-compatible device) and devices connected by HDMI (trademark) centered on the AV receiver 3 (HDMI-connected devices). FIG. 4 is a flowchart that shows the communication procedure between the portable phone 1 that functions as the AV controller 100 (hereinbelow, "the portable phone 1 that functions as the AV controller 100" shall simply be called "the portable phone 1") and each device of the AV system 2.

When the portable phone 1 functions as the AV controller 100 due to launching of the AV controller program 70, first the portable phone 1 requests the information collection of HDMI-connected devices to the AV receiver 3 (Step S1). In the portable phone 1, detection of the AV receiver 3 on the network 8 is performed by a manual operation of the user, but it may also be detected automatically. In response to this information collection request, the AV receiver 3, using HDMI-CEC, requests each device of the AV system 2, that is, the Blu-ray Disc player 4, the set-top box 5, and the television receiver 6, to transmit information of the self-apparatus (Step S2: device information transmission request). In response, the Blu-ray Disc player 4, the set-top box 5, and the television receiver 6 transmit the device information of the self-apparatus to the AV receiver 3, and the AV receiver 3 receives this information (Step S3). The device information to be transmitted is the content as shown in the HDMI-connected device information table of FIG. 5, and shall be described in detail below. The AV receiver 3 creates the HDMI-connected device information table based on the device information received from the Blu-ray Disc player 4, the set-top box 5, and the television receiver 6, and the device information of the AV receiver 3 itself (Step S4).

The HDMI-connected device information table shown in FIG. 5 shall be described. The HDMI-connected device information table stores "device type", "connection", "CEC", "EDID", "OSD Name", "Vender ID", "MAC Address", "uuid", and "service" for each device that constitutes the AV system 2 (the AV receiver 3, the Blu-ray Disc player 4, the set-top box 5, and the television receiver 6).

"Device type" is information that corresponds to the HDMI-CEC logical address. "Device type" is information that identifies whether a device seen from the AV receiver 3 is a device on the input side "INPUT", a device on the output side "OUTPUT", or the self-apparatus (AV receiver 3) "SELF". In the case of this AV system 2, the device identification of the AV receiver 3, the Blu-ray Disc player 4, the set-top box 5, and the television receiver 6 are respectively "SELF", "OUTPUT", "OUTPUT", and "INPUT".

"Connection" is information that shows the connection interface with another device. In relation to "connection", in the case of this AV system 2, all the devices are "HDMI (trademark)". "CEC" is information that shows whether each device has a CEC function. In relation to "CEC", in the case of this AV system 2, all the devices are "yes".

"EDID" is the physical address that shows the position of each device in the HDMI tree structure. The "EDID" of the AV receiver 3, the Blu-ray Disc player 4, the set-top box 5, and the television receiver 6 are respectively "1000", "1100", "1200", and "0000". The connection modes of the AV system 2 shown in FIG. 1 are expressed by these "EDID".

"OSD Name" is the device name that is shown in the display. The "OSD Name" of the AV receiver 3, the Blu-ray Disc player 4, the set-top box 5, and the television receiver 6 are respectively "AV Receiver", "BD Player", "Set Top Box" and "TV".

"Vender ID" is an ID that identifies the maker (vender) that manufactured the device. In the case of this AV system 2, the "vender ID" of the AV receiver 3, the Blu-ray Disc player 4, and the set-top box 5 is the same "0x000000". On the other hand, the "vender ID" of the television receiver 6 is "0x000001". Of the items in the HDMI-connected device information table, "MAC Address", "uuid", and "service" are not generic information of HDMI-CEC, but rather collected by vender-specific commands. For this reason, for the television receiver 6 of a different manufacturer than the AV receiver 3, information of these items cannot be collected.

"MAC Address" is the physical address that is uniquely assigned to a network device. "uuid" is an identifier that is uniquely generated for each network interface. Both are unique values that are assigned to each device of the AV system 2. Thereby, it is possible to identify each device on the network 8.

"Service" is a list of audio/video sources that each device is capable of providing. In the case of this AV system 2, the AV receiver 3 is capable of providing reception of radio (FM) broadcasts (Tuner), reception of Internet radio broadcasts (Net Radio) and playback of music files that are stored on USB storage (USB). The Blu-ray Disc player 4 is capable of providing playback of video discs (Blu-Ray (trademark)), playback of audio CDs (CD), and playback of music files that are stored on USB storage (USB). The set-top box 5 is capable of providing reception of cable television (CATV). In this embodiment, while the television receiver 6 does not receive the service it can provide via HDMI (trademark), reception of terrestrial television broadcasts (TV) is possible.

Of the aforementioned information, the information regarding the Blu-ray Disc player 4, the set-top box 5, and the television receiver 6 is information that is transmitted as device information from the respective devices to the AV receiver 3. The information of the AV receiver 3 is information that is stored in the AV receiver 3 itself.

Returning to FIG. 4, concurrently with the aforementioned operation of the AV receiver 3, the portable phone 1 detects the devices that are connected to the network 8 (Steps S5, S6). For example, it performs an enquiry using SSDP (Step S5), and in response to this, each device of the AV system 2 including the AV receiver 3 returns information (Step S6). In reality, the aforementioned detection process includes a plurality of steps such as detecting devices on the network 8, collecting information from the detected devices, and resolving the MAC addresses by ARP. However, in order to simplify the description in this flowchart, Steps S5 and S6 are shown as one round-trip communication procedure. FIG. 1 shows only the AV system 2 and the portable phone 1, but in the case of other devices, for example other AV devices, being connected on the network 8, that devices also respond to this enquiry. Based on the responses from the devices on the network 8, the portable phone 1 creates the network-compatible device information table 232 shown in FIG. 6 (Step S7).

The network-compatible device information table 232 shown in FIG. 6 includes "IP address" which is identification information of each device on the network 8, "MAC address", "uuid", and "service control command list". Also, the network-compatible device information table 232 includes "OSD name". The "service control command list" is a list of commands used when the portable phone 1 directly controls each device via the network 8. The portable phone 1 acquires the "IP address" and "service control command list" of devices on the network 8 (uPnP devices), moreover resolves the "MAC address" from the "IP address" using ARP, and then creates this table 232.

In the Step S10 described below, based on identification information such as "MAC address" and "uuid", each field (each device) of the network-compatible device information table 232 is associated with the device information of the same device in the HDMI-connected device information table 231 ("device type", "connection", "CEC", "EDID", "OSD Name", "Vender ID", "MAC Address", "uuid", and "service"). "OSD Name" shown in the rightmost column of the network-compatible device information table 232 of FIG. 6 shows that each of the other columns of the network-compatible device information table 232 is linked with the column labeled "OSD Name" of the same name of the HDMI-connected device information table 231.

Returning to FIG. 4, the portable phone 1 makes a request to the AV receiver 3 to transmit the HDMI-connected device information table (Step S8). In response to this, the AV receiver 3 transmits the HDMI-connected device information table created in Step S4 to the portable phone 1 (Step S9). The HDMI-connected device information table is sent in a format such as XML. The portable phone 1 receives this HDMI-connected device information table, and by saving it in the storage area 231 of the RAM 23, sets the received table as the HDMI-connected device information table 231. By comparing this HDMI-connected device information table 231 and the network-compatible device information table 232, based on identification information such as MAC address, the devices on HDMI (trademark) and the devices on the network 8 are associated (Step S10). Thereby, the portable phone 1, by associating the device information obtained from the network 8 with each device of the AV system 2 (the AV receiver 3, Blu-ray Disc player 4, and set-top box 5), is able to directly control them via the network 8. Then, the portable phone 1 displays an operation screen as shown in FIG. 7A and FIG. 7B in the display unit 41, and accepts an operation by the user (Step S11).

Hereinbelow, the operation screen display process that is executed by Step S11, and the control operation of the AV system 2 in response to the operation on the operation screen that is display shall be described.

FIG. 7A and FIG. 7B are diagrams that show display examples of the operation screen displayed on the display unit 41 of the portable phone 1. FIG. 7A is a diagram that shows a display example of the operation screen of the Blu-ray Disc player 4. FIG. 7B is a diagram that shows a display example of the operation screen of the television receiver 6. In FIG. 7A and FIG. 7B, the display of the display unit 41 includes, from the top, a header 400 a service selection area 401, a service operation area 402, and a volume operation area 403. The header 400 displays the current time and an icon (symbol graphic) that denotes Wi-Fi transmission is in progress.

The service selection area 401 shows a list of service icons denoting services that the AV system 2 is capable of providing. The services that the AV system 2 can provide are services that are stored in the "Services" column of the HDMI-connected device information table 231 shown in FIG. 5.

FIG. 8 is a diagram showing the list of service icons that are shown in the service selection area 401. As illustrated, the plurality of service icons 410 to 416 are grouped into video and audio categories rather than device categories. The service icons 210 to 412 are icons that show video-type services, respectively denoting terrestrial television broadcasts, cable television broadcasts, and video discs. The service icons 413 to 416 are icons that show audio-type services, respectively denoting radio broadcasts, Internet radio broadcasts, audio discs, and USB audio files. In Step S11 of FIG. 4, the portable phone 1 classifies the services that can be provided by the AV system 2 into video-type services and audio-type services in a cross-sectional manner, and draws and arranges the service icons as shown in FIG. 8.

According to the HDMI-connected device information table 231 of FIG. 5, both the AV receiver 3 and the Blu-ray Disc player 4 have a USB audio file playback function. Since they are both the same type of service for the user, in this embodiment, they are merged to be shown as one service icon. Based on this policy, terrestrial television broadcasts and cable television broadcasts may be merged and represented as one service icon (television broadcasts). Also, radio broadcasts and Internet radio broadcasts may be merged and represented by one service icon (radio broadcasts).

In the service selection area 401 shown in FIG. 7A and FIG. 7B, a portion of the service icon row shown in FIG. 8 is displayed. When the service selection area 401 is flicked to the left or right by the user, the portable phone 1 moves the icon row to the left or right accordingly to show icons dropped off from the service selection area 401.

When any service icon that is displayed in the service selection area 401 is selected (clicked), the portable phone 1 determines that that service has been selected by the user. Then, the portable phone 1, besides controlling the AV system 2 so that that service is provided, displays in the service operation area 402 the service operation screen for controlling the AV system 2 in accordance with that service.

As stated above, FIG. 7A shows a display example of the service operation screen of the Blu-ray Disc player 4. When the service icon for a video disc or audio disc has been selected, this operation screen is displayed. This service operation screen shows the title of the disc, and also shows operation elements for controlling playback/stoppage of the disc and the like. FIG. 7B is a diagram that shows a display example of the operation screen for operating the television receiver 6. In the service operation area 402, channel keys "1" through "12" are shown, and the four color buttons blue, red, green and yellow are displayed. When the service icon for terrestrial television broadcasts is selected, this operation screen is displayed.

The information that is displayed in the service operation area 402 is not limited to the title of the disc. The jacket image, song lyrics and the like may be acquired and displayed in the service operation area 402.

Regardless of the service that is selected, a volume slider is always shown in the volume operation area 403. By a dragging operation of the user, the colored band in the volume slider elongates or contracts horizontally, and the control command of the volume value corresponding to the length of the band is transmitted to the AV receiver 3.

In the above manner, the operation screen that is displayed in the display unit 41 provides a service-oriented user interface in which the service icons are divided into video system/audio types in order for the user to be able to select a service based on content, services of the same type are merged into a single icon, and program listings and file lists are displayed to enable direct selection of content across devices, rather than broadcast stations and devices. However, since HDMI-CEC information is not linked with information on the network 8, the television receiving device 6 cannot receive an EPG (electronic program guide) via the network 8. For this reason, the operation screen has the user interface which looks like a remote control for controlling the television receiver 6.

Even in the case of not being able to acquire the MAC address and service list via HDMI-CEC as is the case of the television receiver 6 of the present embodiment, that device (television receiver 6) may be specified on the network 8 by some method, and a service list and the like may be acquired via the network 8.

FIG. 9A to FIG. 10C are flowcharts that show the control operation of the AV system 2 by the portable phone 1. In the following flowcharts, a description shall be given for the case of the power of the AV receiver 3 and the television receiver 6 being turned on, and the AV receiver 3 being selected as the input (source) of the television receiver 6. In the case of the power of the AV receiver 3 or the television receiver 6 being turned off, or in the case of the input selection of the television receiver 6 being different, that command should be suitably included in the operation of the flowchart.

Figure 9A:
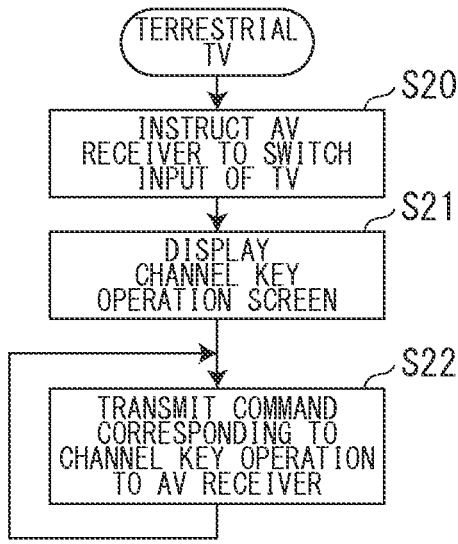
FIG. 9A is a flowchart that shows an operation of the AV controller shown in FIG. 3.

FIG. 9A is a flowchart that shows the operation in the case of the terrestrial television broadcast service icon 410 being clicked, that is, the case of terrestrial television broadcast being selected. As described above, since the vender of the television receiving device 6 differs from the AV receiver 3, the portable phone 1 cannot receive the MAC address and service information. For this reason, the portable phone 1 transmits a command to the AV receiver 3 and controls the television receiver 6 via HDMI-CEC. First, the portable phone 1 instructs the AV receiver 3 to control the television receiver 6 so as to switch its source from an external input to its internal tuner (Step S20). Then, the portable phone 1 displays the channel keys and color buttons as shown in FIG. 7B (Step S21). Next, the portable phone 1 transmits a command corresponding to a key operation to the AV receiver 3 (Step S22). That command is a command that instructs the AV receiver 3 to control the television receiver 6 via HDMI-CEC. The audio of the television receiver 6 is input from the HDMI (trademark) audio return channel to the AV receiver 3, but the television receiver 6 and the AV receiver 3 may be connected by an optical digital cable.

Figure 9B:
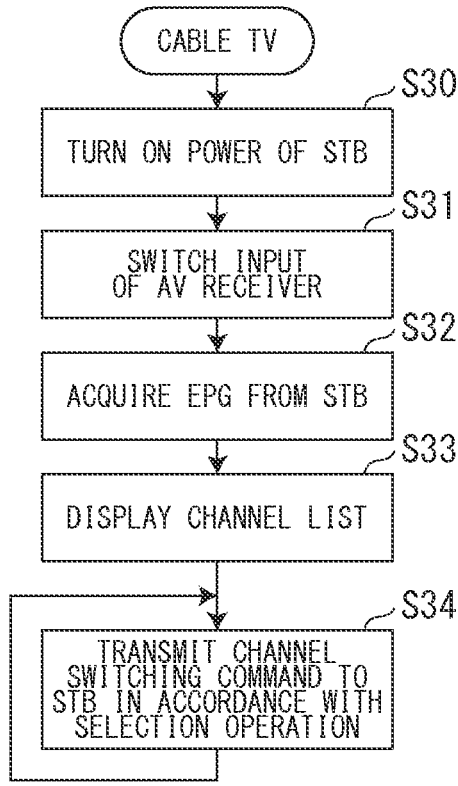
FIG. 9B is a flowchart that shows an operation of the AV controller shown in FIG. 3.

FIG. 9B is a flowchart that shows the operation in the case of the cable television broadcast service icon 411 being clicked, that is, the case of cable television broadcast being selected. When cable television broadcast is selected, the portable phone 1 turns on the power of the set-top box 5 (Step S30) and switches the input of the AV receiver 3 to the set-top box 5 (Step S31). These control commands are directly transmitted via the network 8 to the set-top box 5 and the AV receiver 3. Next, the portable phone 1 transmits a program listing transfer request to the set-top box 5 to obtain the current program listing (Step S32). Then, the portable phone 1 displays in a list format in the service operation area 402 the present program listing that has been obtained (Step S33). In the case of the program listing not fitting in the service operation area 402, scrolling by flicking is enabled. When any program is selected (clicked) by the user, the portable phone 1 transmits a command to the set-top box 5 to select the channel that is broadcasting that program (Step S34).

Figure 9C:
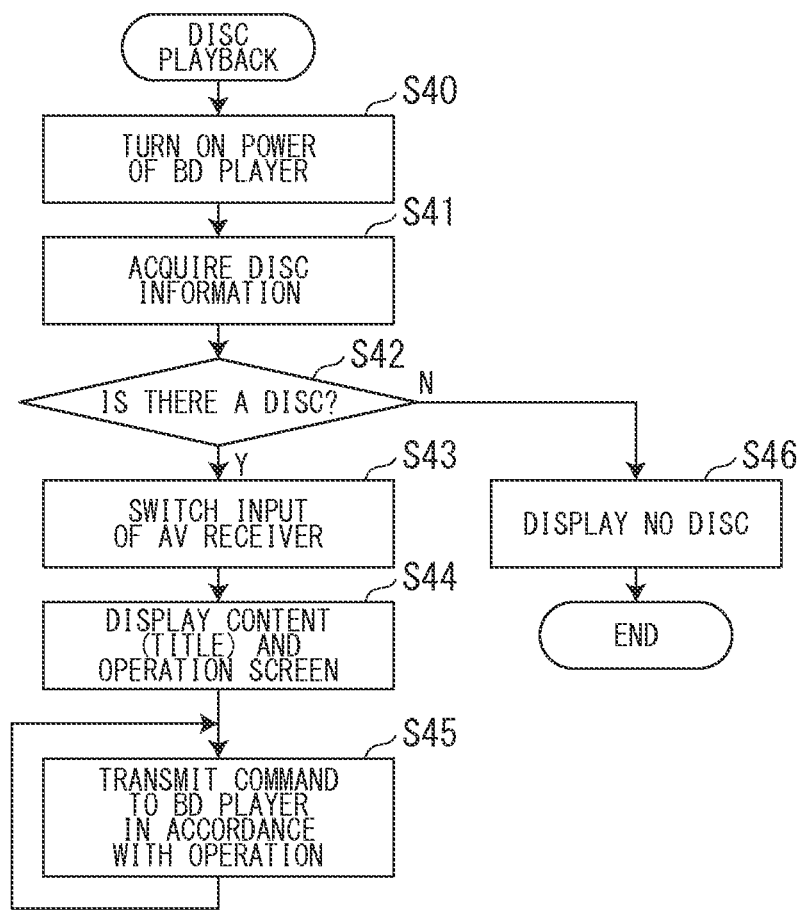
FIG. 9C is a flowchart that shows an operation of the AV controller shown in FIG. 3.

FIG. 9C is a flowchart that shows the operation in the case of disc playback being selected. This is executed when the video disc service icon 412 or the audio disc service icon 415 is selected. The portable phone 1 first turns on the power of the Blu-ray Disc player 5 (Step S40), and acquires the disc information from the Blu-ray Disc player 5 (Step S41). The acquisition of the disc information is performed in a manner in which the portable phone 1 transmits via the network 8 a disc information transfer request to the Blu-ray Disc player 5, and the Blu-ray Disc player 5 in response transfers the disc information via the network 8. When the disc information is sent (YES in Step S42), the portable phone 1 instructs the input of the AV receiver 3 to be changed to the Blu-ray Disc player 5 (Step S43). Next, the portable phone 1 displays the operation key group of the Blu-ray Disc player 5 and the obtained disc information in the service operation area 402 as shown in FIG. 7A (Step S44). Then, the portable phone 1 transmits a command corresponding to the key operation to the Blu-ray Disc player 5 (Step S45). In the case of a disc not being set in the Blu-ray Disc player 5, a message that there is no disc is sent from the Blu-ray Disc player 5 (NO in Step S42). In this case, the portable phone 1 displays "No Disc" in the service operation area 402 (Step S46), and finishes the operation without switching the input of the AV receiver 3.

Figure 10A:
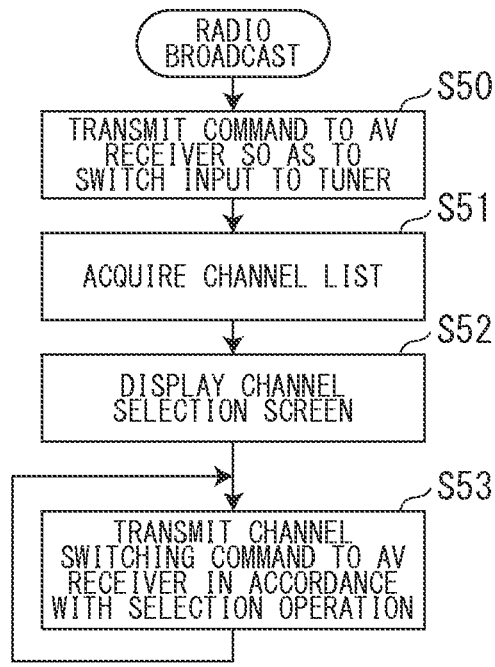
FIG. 10A is a flowchart that shows an operation of the AV controller shown in FIG. 3.

FIG. 10A is a flowchart that shows the operation in the case of the radio broadcast service icon 413 being clicked, that is, in the case of the radio broadcast being selected. When the radio broadcast is selected, the portable phone 1 switches the input (source) of the AV receiver 3 to the tuner 56 (Step S50). Then, the portable phone 1 transmits a channel list transfer request to the AV receiver 3 and obtains the channel list (Step S51). The portable phone 1 displays the acquired channel list in the service operation area 402 (Step S52). In the case of the channel list not fitting in the service operation area 402, scrolling by flicking is enabled. In accordance with the channel selection operation by the user, the portable phone 1 transmits a station selection command to the AV receiver 3 (Step S53). In Steps S51, S52, the portable phone 1 may acquire and display a program listing showing the current broadcast content instead of the channel list.

Figure 10B:
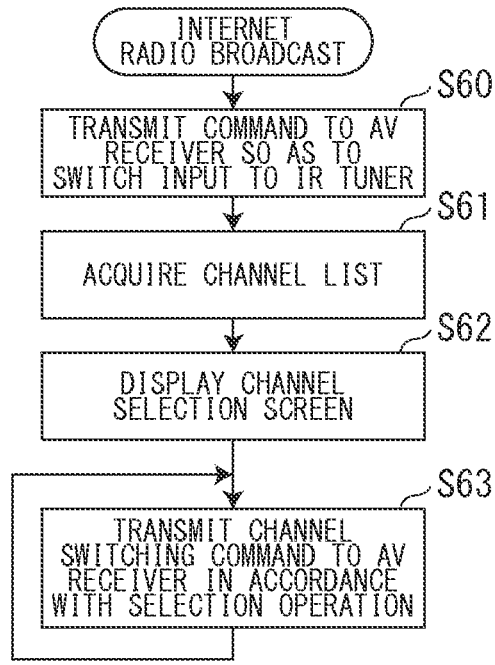
FIG. 10B is a flowchart that shows an operation of the AV controller shown in FIG. 3.

FIG. 10B is a flowchart that shows the operation in the case of the Internet radio broadcast service icon 414 being clicked, that is, in the case of Internet radio broadcast being selected. When the Internet radio broadcast is selected, the portable phone 1 switches the input (source) of the AV receiver 3 to the Internet radio tuner 57 (Step S60). The portable phone 1 then transmits a channel list transfer request to the AV receiver 3 and acquires the Internet radio channel list (Step S61). The portable phone 1 displays the acquired channel list in the service operation area 402 (Step S62). In the case of the channel list not fitting in the service operation area 402, scrolling by flicking is enabled. In accordance with the channel selection operation by the user, the portable phone 1 transmits a station selection command to the AV receiver 3 (Step S63). In Step S61 and Step S62, the portable phone 1 may acquire and display a program listing showing the current broadcast content instead of the channel list.

Figure 10C:
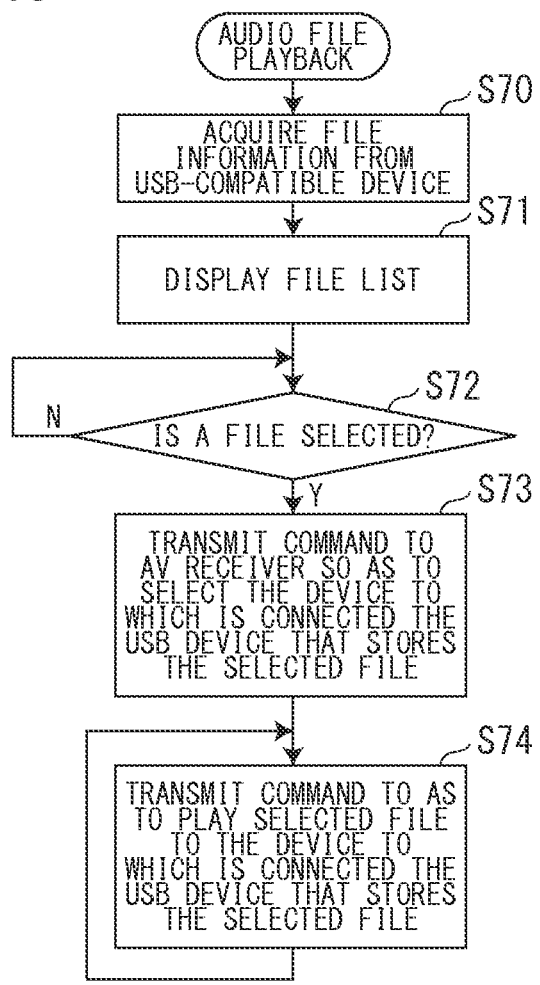
FIG. 10C is a flowchart that shows an operation of the AV controller shown in FIG. 3.

FIG. 10C is a flowchart that shows the operation in the case of the USB audio file service icon 416 being clicked, that is, in the case of USB audio file being selected. The portable phone 1 acquires the file information of the audio file from a USB compatible device (the AV receiver 3 and the Blu-ray Disc player 5 in the case of this embodiment) (Step S70). The acquisition of the file information is performed in a manner in which the portable phone 1 transmits via the network 8 a file information transfer request to the USB compatible device, and the USB compatible device in response transfers the file information via the network 8. The portable phone 1 list-displays the acquired file list in the service operation area 402 (Step S71), and stands by until a file is selected by the user (Step S72). In the case of the list not fitting in the service operation area 402, scrolling by flicking is enabled. When a file is selected (clicked) by the user (YES in Step S72), the portable phone 1 transmits a command to the AV receiver 3 to select the device to which is connected the USB storage in which the selected file is stored (Step S73). Next, the portable phone 1 transmits to the device to which is connected the USB storage in which the selected file is stored a command to playback that selected file (Step S74).

This embodiment has been described providing an AV system including video as an example. However, an audio/video control system according to the embodiment of the present invention means a system that controls a group of devices that playback audio and/or video, so the embodiment of the present invention can also be applied to an audio-only system.

In this embodiment, the service that each device is capable of providing is acquired via HDMI (trademark). However, the portable phone 1 may also directly acquire the service that each device is capable of providing via the network 8. In this embodiment, the portable phone 1 acquires a service control command list from each device of the AV system 2 via the network 8. However, the portable phone 1 may also store it in advance as data that is included in the AV control program 70.

In this embodiment, the AV receiver 3, upon receiving a request from the portable phone 1, collects information of the HDMI connected devices. However, the AV receiver 3 may also autonomously acquire the device information. In this case, the portable phone 1 may start communication with the AV receiver 3 after creation of the network-compatible device information table 232.

The portable phone 1 is capable of playing back a song and performing streaming delivery to the AV receiver 3 via the network 8. Also, it is possible to have the AV receiver 3 recognize the portable phone 1 as a network storage. By utilizing this kind of function, the portable phone 1 may be recognized by the AV receiver 3 as a source device.

The portable phone 1, the AV receiver 3, the Blu-ray Disc player 4, the set-top box 5 and the television receiver 6 that are included in the AV system 2 described above may internally have a computer system. A course of a series of processes related to the aforementioned processing may be stored in a computer-readable recording medium in the form of a program. The aforementioned processes may also be performed by a computer reading out and executing this program. That is to say, each process in the portable phone 1, the AV receiver 3, the Blu-ray Disc player 4, the set-top box 5 and the television receiver 6 may be realized by a central processing unit such as a CPU reading out the program into the main storage device such as ROM or RAM, and executing information processing and arithmetic processing.

INDUSTRIAL APPLICABILITY

The present invention may be applied to a device that controls a group of devices that playback audio and/or video.

REFERENCE SYMBOLS

1: Portable phone
2: AV system
3: AV receiver
20: Control unit
41: Display unit
70: AV controller program
100: AV controller
231: HDMI-connected device information table
232: Network-compatible device information table

The invention claimed is:

1. An audio/video control system comprising:
a plurality of audio/video devices that include a core device and a first device different from the core device, the core device and the first device being interconnected by a digital audio/video interface, both of the core device and the first device being connected to a network without using the digital audio/video interface, the digital audio/video interface and the network being different from each other; and
a portable terminal device that is connected to the network,
wherein the core device includes a first processor for executing stored instructions to:
collect interface-connected device information of at least the first device from at least the first device via the digital audio/video interface, the interface-connected device information including at least unique identification information;
generate a connection device table using the collected interface-connected device information; and
transfer the connection device table to the portable terminal device; and
the portable terminal device includes a second processor for executing stored instructions to:
search the network and acquires network-compatible device information including network addresses and unique identification information of devices on the network;
generate a network compatible device table using the acquired network compatible device information;
directly communicate with the core device via the network without using the first device to acquire, from the core device, the interface-connected device information of at least the first device;
compare and associate the network-compatible device information included in the network compatible device table and the interface-connected device information included in the connection device table to resolve a network address of at least the first device;
display an optional screen that accepts an operation by a user on the portable terminal device; and
directly transmit, to the first device, a control command for controlling the first device via the network using the resolved network address of the first device without the control command passing through the core device.

2. The audio/video control system according to claim 1, wherein the first processor of the core device further collects, as the interface-connected device information, information of an audio source or a video source that is playable by each audio/video device, the portable terminal device includes an operation screen display unit that displays as a list in a selectable manner symbolic images showing the audio sources and video sources that are playable by the plurality of audio devices, and the second processor, in accordance with a selection of a symbolic image by the user, directly transmits to a corresponding audio/video device one or a plurality of commands instructing processing for playing an audio source or a video source that is shown by the selected symbolic image.

3. The audio/video control system according to claim 1, wherein the second processor determines that, among devices on the network, devices having the same unique identification information as the unique identification information included in the interface-connected device information are the plurality of audio/video devices, and resolves network addresses of the devices determined to be the plurality of audio/video devices from the network-compatible device information, and the unique identification information includes at least one of a media access control (MAC) address and a universally unique identifier (uuid).

4. The audio/video control system according to claim 1, wherein the first device is connected to the core device via a path different from the network, the first device transmits the interface-connected device information of the first device to the core device via the path, and the second processor directly transmits the control command to the first device without the control signal passing through the path.

5. The audio/video control system according to claim 1, wherein the core device and the first device are separate from each other.

6. The audio/video control system according to claim 1, wherein the digital audio/video interface includes a physical cable.

7. A portable terminal device connected to a network, comprising:

a processor for executing stored instructions to:

searches the network and acquires network-compatible device information including network addresses and unique identification information of devices on the network;

generate a network compatible device table using the acquired network compatible device information;

directly communicate with a core device via the network without using a first device different from the core device to acquire, from the core device, interface-connected device information of at least the first device, the interface-connected device information including at least unique identification information, the core device and the first device each being one of a plurality of audio/video devices, the core device and the first device being interconnected by a digital audio/video interface, both of the core device and the first device being connected to the network without using the digital audio/video interface, the digital audio/video interface and the network being different from each other;

compare and associate the network-compatible device information included in the network compatible device table and the interface-connected device information included in a connection device table generated by the core device and received by the portable terminal device to resolve a network address of at least the first device;

display an operational screen that accepts an operation by a user on the portable terminal device; and directly transmit, to the first device, a control command for controlling the first device via the network using the resolved network address of the first device without the control command passing through the core device.

8. The portable terminal device according to claim 7, wherein the processor further acquires, as the interface-connected device information, information of an audio source or a video source that is playable by each audio/video device, the portable terminal device further comprises an operation screen display unit that displays as a list in a selectable manner symbolic images showing the audio sources and video sources that are playable by the plurality of audio devices, and the processor, in accordance with a selection of a symbolic image by the user, directly transmits to a corresponding audio/video device one or a plurality of commands instructing processing for playing an audio source or a video source that is shown by the selected symbolic image.

9. The portable terminal device according to claim 7, wherein the processor determines that, among devices on the network, devices having the same unique identification information as the unique identification information included in the interface-connected device information are the plurality of audio/video devices, and resolves network addresses of the devices determined to be the plurality of audio/video devices from the network-compatible device information, and the unique identification information includes at least one of a media access control (MAC) address and a universally unique identifier (uuid).

10. The portable terminal device according to claim 7, wherein the digital audio/video interface includes a physical cable.

11. A non-transitory computer-readable recording medium storing an audio/video control program that causes a processor of a portable terminal device connected to a network to:

search the network and acquires network-compatible device information including network addresses and unique identification information of devices on the network;

generate a network compatible device table using the acquired network compatible device information;

directly communicate with a core device via the network without using a first device different from the core device to acquire, from the core device, interface-connected device information of at least the first device, the interface-connected device information including at least unique identification information, the core device and the first device each being one of a plurality of audio/video devices, the core device and the first device being interconnected by a digital audio/video interface, both of the core device and the first device being connected to the network without using the digital audio/video interface, the digital audio/video interface and the networking being different from each other;

compare and associated the network-compatible device information included in the network compatible device table and the interface-connected device information included in a connection device table generated by the core device and received by the portable terminal device to a resolve network address of at least the first device;

display an operational screen that accepts an operation by a user on the portable terminal device; and directly transmit, to the first device, a control command for controlling the first device via the network using the resolved network address of the first device without the control command passing through the core device.

12. The non-transitory computer-readable recording medium according to claim 11, wherein the audio/video control program further causes the control unit of the portable terminal device to function as an operation screen display unit that displays as a list in a selectable manner symbolic images showing the audio sources and video sources that are playable by the plurality of audio/video devices, wherein the processor further acquires, as the interface-connected device information, information of an audio source or a video source that is playable by each audio/video device, and the processor, in accordance with a selection of a symbolic image by the user, directly transmits to a corresponding audio/video device one or a plurality of commands instructing processing for playing an audio source or a video source that is shown by the selected symbolic image.

13. The non-transitory computer-readable recording medium according to claim 11, wherein the digital audio/video interface includes a physical cable.

14. An audio/video control method for a portable terminal device connected to a network, the audio/video control method comprising:

searching the network and acquiring network-compatible device information including network addresses and unique identification information of devices on the network;

generating a network compatible device table using the acquired network compatible device information;

directly communicating with a core device via the network without using a first device different from the core device to acquire, from the core device, interface-connected device information of at least the first device, the interface-connected device information including at least unique identification information, the core device and the first device each being one of a plurality of audio/video devices, the core device and the first device being interconnected by a digital audio/video interface, both of the core device and the first device being connected to the network without using the digital audio/video interface, the digital audio/video interface and the network being different from each other;

comparing and associating the network-compatible device information included in the network compatible device table and the interface-connected device information included in a connection device table generated by the core device and received by the portable terminal device to resolve a network address of at least the first device, displaying an operational screen that accepts an operation by a user on the portable terminal device; and directly transmitting, to the first device, a control command for controlling the first device via the network using the resolved network address of the first device without the control command passing through the core device.

15. The audio/video control method according to claim 14, wherein the digital audio/video interface includes a physical cable.

* * * * *